(12) United States Patent
Linnell et al.

(10) Patent No.: US 10,220,511 B2
(45) Date of Patent: Mar. 5, 2019

(54) CUSTOMIZED ROBOTIC INSTALLATION BASED ON MEASUREMENTS COLLECTED ON SITE

(71) Applicant: X Development LLC, Mountain View, CA (US)

(72) Inventors: Jeff Linnell, Woodside, CA (US); Anthony Jules, Oakland, CA (US); Marek Michalowski, San Francisco, CA (US); Kendra Byrne, San Francisco, CA (US); Jonathan Proto, San Francisco, CA (US); Brandon Kruysman, San Francisco, CA (US); Eli Reekmans, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 203 days.

(21) Appl. No.: 15/222,583

(22) Filed: Jul. 28, 2016

(65) Prior Publication Data

US 2018/0029227 A1 Feb. 1, 2018

(51) Int. Cl.
*B25J 9/16* (2006.01)
*B25J 13/08* (2006.01)
(Continued)

(52) U.S. Cl.
CPC ............ *B25J 9/163* (2013.01); *B25J 9/1669* (2013.01); *B25J 9/1671* (2013.01); *B25J 9/1674* (2013.01);
(Continued)

(58) Field of Classification Search
CPC ...... B25J 9/1692; B25J 9/1669; B25J 9/1687; B25J 11/005; B25J 13/089; B25J 9/1661;
(Continued)

(56) References Cited

U.S. PATENT DOCUMENTS

| 5,325,468 A * | 6/1994 | Terasaki ................ B25J 9/1661 700/262 |
| 6,237,210 B1 * | 5/2001 | Stoewer .................... B64C 1/00 29/243.53 |

(Continued)

OTHER PUBLICATIONS

International Search Report and Written Opinion issued in International Application No. PCT/US2017/044095, dated Dec. 4, 2017, 15 pages.

(Continued)

*Primary Examiner* — Jason Holloway
(74) *Attorney, Agent, or Firm* — Fish & Richardson P.C.

(57) ABSTRACT

A robotic system includes one or more end-effectors that combine, according to a production process, at least one object and structure(s) at a production site. Sensor(s) generate, from the production site, sensor data relating to the production process. A control system stores specifications for the production process based on a model of the production site and/or the at least one object. The control system: receives, from the sensor(s), the sensor data; determines, from the sensor data, properties of at least one of: the production site or the at least one object; determines difference(s) between the properties and the model; determine(s) adjustment(s) to the production process based on the difference(s); and sends, for the end-effector(s), instruction(s) for combining the at least one object and the structure(s) based on the specifications and the one or more adjustments to the production process.

18 Claims, 9 Drawing Sheets

(51) Int. Cl.
  *G05B 17/02* (2006.01)
  *E04G 21/22* (2006.01)
(52) U.S. Cl.
  CPC ............ *B25J 13/089* (2013.01); *E04G 21/22* (2013.01); *G05B 17/02* (2013.01); *G05B 2219/45086* (2013.01)
(58) Field of Classification Search
  CPC ........ B25J 9/1671; B25J 9/163; B25J 9/1674; E04G 21/22; G05B 19/4063; G05B 17/02; G05B 2219/45086; G05B 2219/39024; G05B 19/41885; G05B 2219/39479; G05B 2219/39536; B65G 61/00
  See application file for complete search history.

(56) References Cited

U.S. PATENT DOCUMENTS

| | | | | |
|---|---|---|---|---|
| 8,888,434 | B2* | 11/2014 | Rebstock | H01L 21/67769 414/217 |
| 2005/0196484 | A1* | 9/2005 | Khoshnevis | B29C 64/106 425/463 |
| 2009/0038258 | A1* | 2/2009 | Pivac | B25J 5/00 52/749.14 |
| 2011/0288667 | A1* | 11/2011 | Noda | B25J 9/1661 700/98 |
| 2012/0180424 | A1* | 7/2012 | Hinshaw | E04B 1/26 52/745.02 |
| 2014/0283357 | A1* | 9/2014 | Harada | B23P 21/004 29/430 |
| 2015/0082740 | A1* | 3/2015 | Peters | E04G 21/22 52/747.12 |
| 2015/0336272 | A1* | 11/2015 | Drew | B25J 9/1687 156/64 |
| 2017/0235300 | A1* | 8/2017 | Maruno | G06T 7/74 700/112 |
| 2017/0254102 | A1* | 9/2017 | Peters | E04G 21/22 |

OTHER PUBLICATIONS

International Search Report and Written Opinion issued in International Application No. PCT/US2017/044076, dated Dec. 6, 2017, 15 pages.

* cited by examiner

CUSTOMIZED ROBOTIC INSTALLATION BASED ON MEASUREMENTS COLLECTED ON SITE

BACKGROUND

A robot may include one or more end-effectors that allow the robot to manipulate objects and one or more sensors to guide the manipulation of the objects. For example, a robot can use the end-effector(s) and sensor(s) to combine a plurality of objects into a desired physical structure.

SUMMARY

To produce a physical structure from a plurality of physical objects at a production site, a robot may be guided by design specifications that are generated from a model for the physical structure. Prior to the production process, the robot may take measurements of the physical objects and other aspects of the production site. Variations in these measurements can affect the production process. Advantageously, the robot can customize the production process to account for such variations. The design specifications provide the robot with the necessary flexibility to customize the production process. The design specifications define a flexible design space where different parameters in the production process can be adjusted to accommodate the measurements. Although adjustments to the production process may change aspects of the resulting physical structure, the customized production process preserves the intent of the designer as set forth in the model.

According to an example embodiment, a robotic system includes a body including one or more end-effectors configured to combine, according to a production process, at least one object and one or more structures at a production site. The system includes one or more sensors configured to generate, from the production site, sensor data relating to the production process. The system includes a control system including one or more processors and one or more data storage devices. The control system is communicatively coupled to the one or more sensors. The one or more data storage devices store specifications for the production process based on a model of the at least one object and the production site. The control system is configured to receive, from the one or more sensors, the sensor data; determine, from the sensor data, properties of at least one of: the production site or the at least one object; determine one or more differences between the properties and the model; determine one or more adjustments to the production process based on the one or more differences; and send, for the one or more end-effectors, one or more instructions for combining the at least one object and the one or more structures based on the specifications and the one or more adjustments to the production process.

According to another example embodiment, a method for a robotic system includes positioning one or more end-effectors of a robot at a production site. The one or more end-effectors are configured to combine, according to a production process, at least one object and one or more structures at the production site. The method includes determining, with one or more sensors at the production site, sensor data relating to the production process. The method includes storing, on one or more data storage devices, specifications for the production process based on a model of at least one of the production site or the at least one object. The method includes determining, from the sensor data, properties of at least one of the production site or the at least one object. The method includes determining one or more differences between the properties and the model. The method includes determining one or more adjustments to the production process based on the one or more differences. The method includes sending, for the one or more end-effectors, one or more instructions for combining the at least one object and the one or more structures based on the specifications and the one or more adjustments to the production process.

According to yet another example embodiment, a method for a robotic system includes storing, on one or more data storage devices, a model for a production process combining a plurality of physical objects. The method includes determining, with one or more sensors, sensor data relating to the plurality of physical objects. The method includes determining, by a control system including one or more processors, one or more differences between the model and the sensor data. The method includes determining one or more adjustments to the production process based on the one or more differences between the model and the sensor data. The method includes combining, with one or more end effectors, the plurality of physical objects based on the model and the one or more adjustments to the production process.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
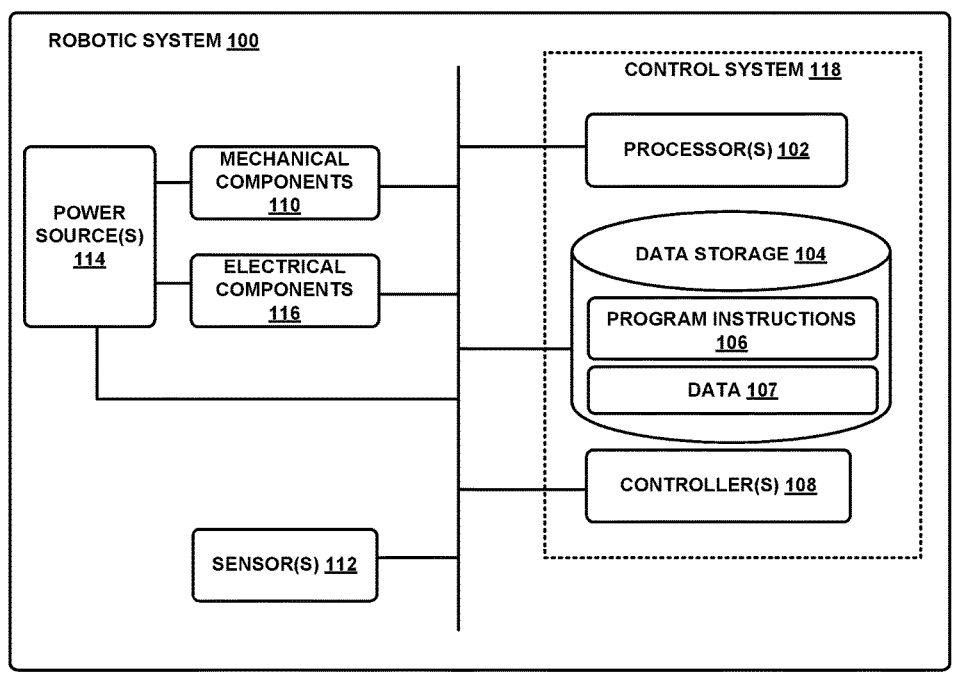
FIG. 1 illustrates an example configuration of a robotic system according to aspects of the present disclosure.

The following detailed description describes various features and functions of the disclosed systems and methods with reference to the accompanying figures. The illustrative system and method embodiments described herein are not meant to be limiting. It will be readily understood that certain aspects of the disclosed systems and methods can be arranged and combined in a wide variety of different configurations, all of which are contemplated herein.

I. Overview

A robot may include one or more end-effectors that allow the robot to manipulate or otherwise engage physical objects and one or more sensors to guide the manipulation of the physical objects. At a production site, the robot can use the end-effector(s) and sensor(s) to combine a plurality of physical objects into a desired physical structure. According to an example, the desired physical structure may be a bridge, the physical objects may be the materials, such as concrete piles, girders, decking pieces, etc., that are combined to construct the bridge, and the production site may be a river site including opposing river banks and the area between the river banks.

To produce this physical structure, the robot may be guided by design specifications that are generated from a model for the physical structure. The model may provide a designer's conception of how the physical structure will be configured and how it will perform when actually produced by the robot. To develop the model, the designer may define a plurality of model objects, which may provide the designer's conception of what physical objects are combined to produce the physical structure. The designer designs each model object to contribute an appropriate set of properties that helps the physical structure to provide the desired configuration and performance.

The designer also defines relationships between the model objects. These relationships determine how the model objects are combined for the physical structure. For instance, these relationships may determine positions/orientations of the model objects relative to other model objects. In addition, these relationships may determine how the model objects are directly or indirectly coupled to each other. Furthermore, these relationships may determine what manufacturing, assembly, or other production techniques to employ to combine the model objects.

The designer may further define aspects of the model according to a model production site. The model production site models external structures and conditions at the production site where the physical structure will be produced. The designer may also determine relationships between the model objects and aspects of the model production site.

In the example above, the designer may develop a model that provides a civil engineer's conception of how the concrete piles, girders, decking pieces, and other construction materials can be combined to build the desired bridge. The designer models piles, girders, decking pieces, and other construction materials to have the desired properties for the bridge. In addition, the designer models the relationships between piles, girders, decking pieces, and other construction materials, indicating for instance how they are positioned/oriented relative to each other, how they are connected to each other, and how they are installed at the river site according to different construction techniques. Furthermore, the designer may model aspects of the river site that may affect the construction of the bridge, including for instance the characteristics of the ground at the river banks where the bridge is anchored.

Ideally, the robot produces a physical structure that closely resembles the model as initially conceived by the designer. The actual physical objects and the production site, however, might differ from how they are initially modeled by the model. According to aspects of the present disclosure, the robot can dynamically address such differences by adjusting aspects of the production process. By allowing the robot to adjust the production process on its own, the production process can continue without interruption and/or intervention by operators or the like.

In the example above, the robot may take measurements and assess other aspects of the construction materials and the river site before bridge construction begins. From these measurements, the robot can identify how the construction materials and the river site differ from the way they are modeled by the designer. The robot can assess these differences to decide whether the construction of the bridge should proceed. If necessary, the robot can adjust the construction process to account for the differences and produce the desired bridge. If adjustments cannot overcome the differences, the robot can decide not to start the construction process.

Although the adjustments to the production process may change aspects of the resulting physical structure, the robot can ensure that the production process preserves the intent of the designer as provided in the model. The intent of the designer is preserved if the production process produces a physical structure that is consistent with the concepts defined by the designer in the model. In other words, the robot can customize the production process to address issues in the production process while still producing a physical structure generally consistent with the model.

In particular, the design specifications derived from the model provide the robot with the necessary flexibility to customize the production process. The design specifications define a flexible design space where different parameters in the production process can be adjusted to accommodate reality. When developing the model, the designer may define one or more constraints that establish the scope of allowable modifications to the production process. The constraints generally reflect the features that are most significant to the designer and indicate the designer's intent behind the model. The robot can evaluate the constraints to determine how to customize the production process for the physical structure.

In the example above, the designer of the bridge may define constraints that require the bridge to have certain load-bearing characteristics. The designer may also define constraints based on safety regulations. If necessary, the robot can then make adjustments to the construction process to account for deviations from the designer's model as long as the final bridge can be constructed within the constraints. For instance, based on an assessment of the river site, the robot may determine that the properties of the ground at the river banks deviate from the designer's model of the river site and that the concrete piles may need to be installed at locations that differ from the model, but the final bridge will still have the desired load-bearing characteristics.

When developing the model, the designer may also define preferences, which can further guide customization of the production process. For instance, if the production process can be customized according to a plurality of different approaches, the robot can evaluate the preferences to determine a preferred approach that yields a physical structure most consistent with the designer's intent.

II. Example Robotic System

FIG. 1 illustrates an example configuration of a robotic system 100 that may be used in connection with the embodiments described herein. The robotic system 100 may be configured to operate autonomously, semi-autonomously, and/or using directions provided by user(s). The robotic system 100 may be implemented in various forms, such as a biped robot, quadruped robot, a robotic arm, or some other arrangement. Furthermore, the robotic system 100 may also be referred to as a robot, robotic device, or mobile robot, among other designations. Generally, the robotic system 100 provides a device that has a computing ability and can interact with its surroundings with an actuation capability and/or with ability to emit/generate physical phenomena such as light and/or sound, among others.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. The robotic system 100 is shown for illustrative purposes, and may include more or fewer components. The various components of the robotic system 100 may be connected in any manner, including wired or wireless connections. Further, in some examples, components of the robotic system 100 may be distributed among multiple physical entities rather than a single physical entity. Other example embodiments of the robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by the processor(s) 102. The one or more computer-readable storage media can include volatile and/or non-volatile storage components, such as optical, magnetic, organic, or another type of memory or storage, which can be integrated in whole or in part with the processor(s) 102. In some embodiments, the data storage 104 can be a single physical device. In other embodiments, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks) interface between any combination of the mechanical components 110, the sensor(s) 112, the power source(s) 114, the electrical components 116, the control system 118, and/or a user of the robotic system 100. In some embodiments, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between the mechanical components 110 and/or the electrical components 116. In some instances, the control system 118 may serve as an interface between the robotic system 100 and another computing device.

During operation, the control system 118 may communicate with other systems of the robotic system 100 via wired or wireless connections, and may further be configured to communicate with one or more users of the robotic system 100. As one possible illustration, the control system 118 may receive an input (e.g., from a user or from another robot) indicating an instruction to perform a particular action.

A wired connection in the robotic system 100 may include, for example, a parallel bus or a serial bus such as a Universal Serial Bus (USB). Meanwhile, a wireless connection in the robotic system 100 may include, for example, Bluetooth, IEEE 802.11 (such as IEEE 802.11-2007, IEEE 802.11n-2009, or any other IEEE 802.11 revision), cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (such as CDMA, GSM, or WiMAX, as well as "WiFi" connectivity using IEEE 802.11).

The robotic system 100 may include access points through which the control system 118 may communicate with a cloud server or other network resource. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

Further, the control system 118 may serve as an interface between the robotic system 100 and a user. For instance, the control system 118 may include various components for communicating with the robotic system 100. The example interfaces and communications may be implemented via a wired or wireless connection, or both.

The control system 118 may include an input/output unit. The input/output unit may output information to a user through a display. The display may take on any form and may be arranged to project images and/or graphics to a user of the control system 118. As such, the display may show a graphical user interface (GUI) that may provide an application through which the user may interact with the systems disclosed herein.

Additionally, the input/output unit may receive user-input (e.g., from the user of the control system 118). In particular, the input/output unit may allow for interaction with the GUI such as for scrolling, providing text, and/or selecting various features of the application, among other possible interactions. The input/output unit may take on various forms. In one example, the input/output unit may include a pointing device such as a computing mouse used for control of the GUI. However, if the input/output unit includes a touch screen display, touch-input can be received (e.g., such as using a finger or a stylus) that allows for control of the GUI. In another example, the input/output unit may include a keyboard that provides for selection of numbers, characters and/or symbols to be displayed via the GUI. For instance, in the arrangement where the input/output unit includes a touch screen display, portions the display may show the keyboard. Thus, touch-input on the portion of the display including the keyboard may result in user-input such as selection of specific numbers, characters, and/or symbols to be shown on the GUI through the display. In yet another example, the input/output unit may include a voice input device that receives audio input, such as from a user through a microphone, that is then interpretable using one of various speech recognition techniques into one or more characters that may be shown through the display. Other examples may also be possible.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that enable the robotic system 100 to perform physical operations. As a few examples, the mechanical components 110 may include physical members such as leg(s), arm(s), and/or wheel(s).

The physical members or other parts of robotic system 100 may further include actuators arranged to move the physical members in relation to one another. An actuator is a mechanism that may be used to introduce mechanical motion. An actuator may be configured to convert stored energy into movement of one or more components. Various mechanisms may be used to power an actuator. For instance, actuators may be powered by chemicals, compressed air, hydraulics, or electricity, among other possibilities. With this arrangement, actuators may cause movement of various movable components of the robotic system 100. For instance, the leg(s) and/or arm(s) may include one or more members connected by joints and configured to operate with various degrees of freedom with respect to one another via actuators.

Furthermore, the mechanical components 110 may include one or more end-effector(s). For instance, an end-effector may be disposed on the end of an arm, which can be operated via actuators to position the end-effector. The end-effector(s) may be employed to perform a task by manipulating objects, acting on loads, etc. For instance, the robotic system 100 may use the end-effector(s) for gripping, turning, carrying, pulling, and/or pushing objects. The end-effector(s) may include hand-like structures with movable fingers. Alternatively or additionally, the end-effector(s) may include other types of appendages or attachments, such as grippers, welding tools, cutting tools, among other possibilities.

The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, legs, and/or end-effectors so that these appendages can be replaced or changed as needed or desired. In some embodiments, the robotic system 100 may include one or more removable and/or replaceable battery units or sensors. Other types of removable components may be included within some implementations.

The robotic system 100 may include the sensor(s) 112 arranged to sense aspects of the robotic system 100. The sensor(s) 112 may include one or more force sensors, torque sensors, velocity sensors, acceleration sensors, gyroscopic sensors, position sensors, proximity sensors, motion sensors, location sensors, load sensors, temperature sensors, thermal imaging sensors, touch sensors (e.g., capacitive sensors), optical sensors, wireless sensors, radio sensors, depth sensors (e.g., RGB-D, laser, structured-light, and/or a time-of-flight camera), point cloud sensors, range sensors (e.g., ultrasonic and/or infrared), infrared sensors, object sensors, and/or cameras (e.g., color cameras, grayscale cameras, and/or infrared cameras), Radio Frequency identification (RFID) systems, Near Field Communication (NFC) chips, among other possibilities. Within some examples, the robotic system 100 may be configured to receive sensor data from the sensor(s) 112 that are physically separated from the robot (e.g., sensors that are positioned on other robots or located within the environment in which the robot is operating). Further, the sensor(s) 112 may be incorporated within existing devices, such as mobile phones, laptops, and/or tablets.

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), a laser tracker system, one or more cameras (e.g., stereoscopic cameras for 3D vision), a global positioning system (GPS) transceiver, and/or other sensors for capturing information of the environment in which the robotic system 100 is operating. The sensor(s) may also include The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or the electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

The robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

III. Example Embodiment of a Robotic System for Producing a Structure

Figure 2:
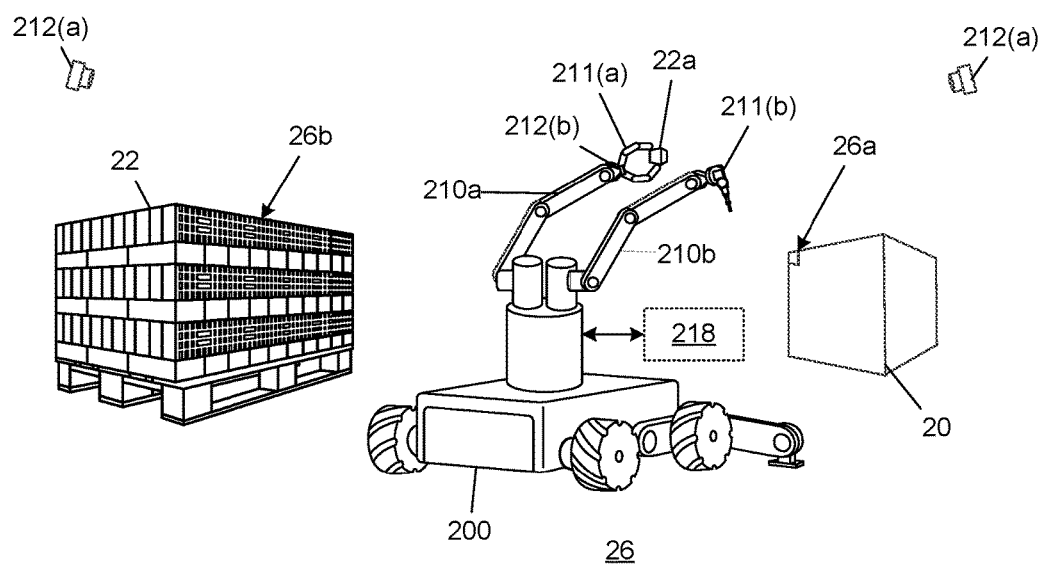
FIG. 2 illustrates an example robot that produces a physical structure at a production site, according to aspects of the present disclosure.

FIG. 2 illustrates a robot 200 that includes aspects of the robotic system 100 described above, such as the mechanical components 110, the sensor(s) 112, the power source(s) 114, the electrical components 116, and/or the control system 118. Operating at a production site 26, the robot 200 works with a plurality of physical objects 22 to produce a physical structure 20.

According to one example, a production site may be a factory floor where a robot installs parts in an assembly line to build a product (e.g., consumer goods, vehicle parts, etc.). According to an additional example, a production site may be a work cell, rather than an assembly line, where a robot combines a variety of parts to build a product from start to finish. In these examples, the production site may be a temporary location from which the final physical structure may be delivered (e.g., as a product) to another location (e.g., a distributor or customer location) when completely built.

According to another example, a production site may be a river site where a robot works with heavy construction materials to build a bridge. According to yet another example, a production site may be the interior of a house where a robot installs housing materials to construct a section of the house. In these examples, the final physical structure is installed in the production site.

As shown in FIG. 2. the robot 200 is configured to complete specific tasks at the production site 26. For instance, the robot 200 may include a variety of end-effectors 211. In particular, an end-effector 211(a) is disposed at the end of an arm 210a that allows the robot 200 to grip a physical object 22a and position the physical object 22a at a specified location 20a at the production site 26. The robot 200 may also include another end-effector 211(b) disposed at the end of another arm 210b that allows the robot 200 to fix or otherwise couple the physical object 22a to a surface at the specified location 20a. For instance, the end-effector 211b may include a tool, such as a nail gun, a glue gun, or welding torch, to fix the physical object 22a in place.

Although FIG. 2 illustrates the single robot 200, the production site 26 may include other robots that work with the robot 200 to produce aspects of the physical structure 20. Each robot at the production site 26 may be configured to complete specific assigned tasks in the production process. Thus, in an alternative example, the robot 200 may be assigned to position the physical object 22a in the specified location 20a, while another robot (not shown) may be assigned to fix the physical object 22a to the specified location 20a with its own end-effector (e.g., nail gun, glue gun, or welding torch).

As shown in FIG. 2, the robot 200 may employ various sensors 212 to guide its operation at the production site 26. The sensors 212 may include local sensors that are directly coupled to the robot 200. Additionally or alternatively, the sensors 212 may include global sensors that are disposed in other areas of the production site 26 separate from the robot 200. For instance, some of the global sensors may be arranged in fixed locations throughout the production site 26. Additionally or alternatively, some of the global sensors may be coupled to other robots at the production site 26.

The sensors 212 may include any of the sensors 112 described above. For instance, to produce the physical structure 20, one or more sensors 212(a) can determine the location of the robot 200 relative to a storage location 20b where the physical objects 22 are stored at the production site 26. The robot 200 can employ data from the one or more sensors 212(a) to move to the location 20b and place the physical objects 22 within range of the end-effector 211(a). Additionally, one or more sensors 212(b) can determine the location of the end-effector 211(a) relative to the physical objects 22, so that the end-effector 211(a) can be extended to the retrieve the physical object 22a from the storage location 20b. With the physical object 22a in the grip of the end-effector 211(a), the one or more sensors 212(a) can then determine the location of the robot 200 relative to the location 20a. The robot 200 can employ data from the one or more sensors 212(a) to move to the position 20a where the physical object 22a is to be fixed in the production process. The one or more sensors 212(b) can then determine the location of the end-effector 211(a) relative to the location 20a, so that the end-effector 211(a) can be extended to position the physical object 22a precisely at the location 20a. As shown in FIG. 2, the one or more sensors 212(a) may be global sensors, while the one or more sensors 212(b) may be local sensors disposed on the arm 210b of the robot 200. The sensors 212(a), (b), however, may be any combination of local and global sensors.

One or more additional sensors 212 may be further employed to ensure that the physical object 22a is manipulated and positioned at the location 22a with a desired orientation. Other sensors 212 may be employed to guide the operation of the end-effector 211(b) to fix the physical object 22a to a surface at the location 20a. Yet other sensors 212 may perform measurements to determine the size and shape of the physical object 22a to ensure that the physical object 22a can be positioned at the location 20a with the appropriate orientation.

A control system 218 is employed to operate the robot 200. The control system 218 may be similar to the control system 118 described above. Aspects of the control system 218 may be included as part of the robot 200 and/or be separate from the robot 200.

The control system 218 can receive data from the sensors 212 via wired and/or wireless connections. The control system 218 can then operate the robot 200 in response to the sensor data. For instance, in the example above, the control system 218 can cause the robot 200 to move to locations 20a, b based on the data from the sensors 212(a) and to manipulate or otherwise engage the physical object 22a based on the data from the sensors 212(b).

IV. Example Model for Producing a Structure with a Robotic System

Figure 3:
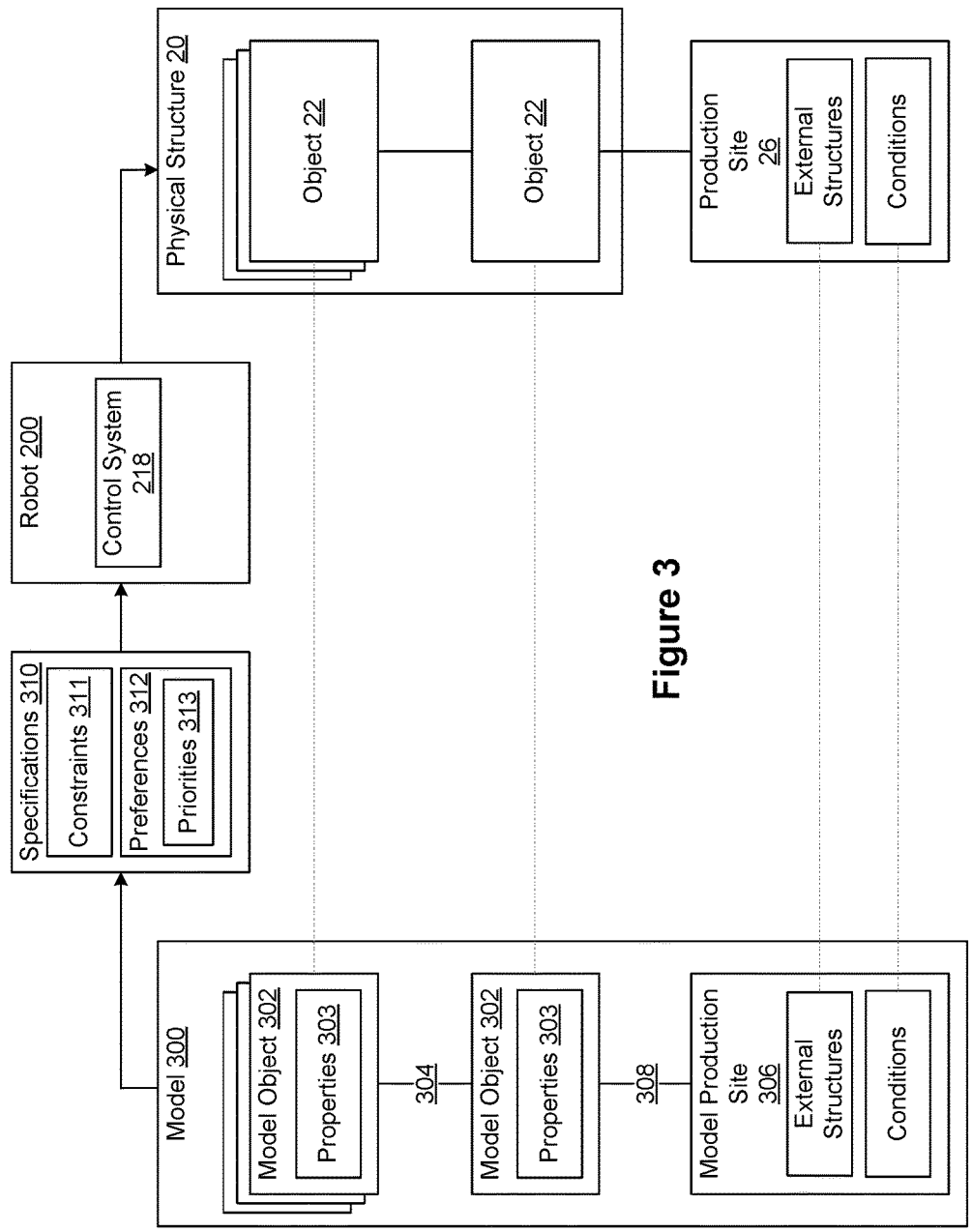
FIG. 3 illustrates an example process for generating the design specifications from a model and producing a physical structure from the design specifications, according to aspects of the present disclosure.

To produce the physical structure 20 from the plurality of physical objects 22, the control system 218 of the robot 200 above can execute computer-readable program instructions 206 based on design specifications 310. FIG. 3 illustrates an example process for generating the design specifications 310 and producing the physical structure 20 from the design specifications 310.

A designer develops a model 300 for the physical structure 20. In general, the model 300 provides the designer's conception of how the physical structure 20 will be configured and how it will perform when actually produced by the robot 200.

To develop the model 300, the designer defines a plurality of model objects 302. In general, the model objects 302 provide the designer's conception of what physical objects 22 are combined to produce the physical structure 20 according to the model 300. The designer designs each model object 302 to contribute an appropriate set of properties 303 that helps the physical structure 20 to provide the desired configuration and performance. Some of the model objects 302 may share an identical set of properties 303, while other model objects 302 may have different respective sets of properties 303.

The set of properties 303 of each model object 302 may include desired aesthetic properties, such as color, markings, visual patterns, shape, size, and surface finish/texture, among other properties. Additionally or alternatively, the set of properties 303 may include desired mechanical properties, such as bending strength, brittleness, bulk modulus, coefficient of friction, compressive strength, creep, elasticity, fatigue strength, flexibility, fracture toughness, hardness, plasticity, resilience, shear strength, stiffness, stress/strain properties, surface roughness, tensile strength, toughness, viscosity, yield strength, and weight, among other properties. Additionally or alternatively, the set of properties 303 may include electrical and/or magnetic properties, such as capacitance, conductivity, density, dielectric strength, field properties, inductance, permittivity, and resistance, among other properties. Additionally or alternatively, the set of properties 303 may include chemical properties, such as corrosion resistance, flammability, pH, reactivity, stability, surface energy/tension, and toxicity, among other properties. Additionally or alternatively, the set of properties 303 may include manufacturing properties for coating, cutting, drilling, forming and shaping processes, heat treating, joining, machining, rolling, sanding, and welding, among other techniques. Additionally or alternatively, the set of properties 303 may include optical properties, such as absorbance, fluorescence, photosensitivity, reflectivity, refractive index, scattering, and transmittance, among other properties. Additionally or alternatively, the set of properties 303 may include thermal properties, such as boiling point, critical point, emissivity, melting point, specific heat, thermal conductivity, thermal diffusivity, and thermal expansion, among other properties.

In some cases, a model object 302 may refer to a stock part with a known set of properties 303. As such, specifying the stock part may be sufficient to communicate the set of properties 303, and it may not be necessary to state the entire set of properties 303 expressly when developing the model 300.

In other cases, a model object 302 may refer to a part that is formed from stock material with a known set of properties 303. For instance, the model part 302 may be a rod of stock material that is cut to a certain length. As such, specifying the stock material and indicating specific dimensions for the model object 302 may be sufficient to communicate the set of properties 303, and it may not be necessary to state the properties of the stock material expressly when developing the model 300.

Although some model objects 302 may model raw materials or simple objects with fewer parts, other model objects 302 may also model more complex sub-assemblies. Each sub-assembly combines a plurality of parts, which act together to provide a desired set of properties. For instance, a sub-assembly may provide a motor, where the motor itself includes a plurality of different parts that work together to electromechanically drive other physical objects 22 in the physical structure 20. In this case, the set of properties for the motor may include size, shape, power output, and torque output, among other properties.

To develop the model 300, the designer also defines relationships 304 between each model object 302 and other model objects 302. The relationships 304 determine how the model objects 302 are combined. For instance, the designer may determine positions/orientations of the model objects 302 relative to other model objects 302. In addition, the designer may determine how the model objects 302 are directly or indirectly coupled to each other. Such couplings may include mechanical couplings, electrical/electronic couplings, or data communication couplings, among other possibilities. Furthermore, the designer may determine what manufacturing, assembly, or other production techniques to employ to combine the model objects 302.

The designer may further define aspects of the model 300 according to a model production site 306. The model production site 306 models external structures and conditions at the production site 26, which are relevant to producing the physical structure 20.

The designer determines relationships 308 between the model objects 302 and the model production site 306. For instance, the designer may determine positions/orientations of the model objects 302 relative to external structures in the model production site 306. In addition, the designer may determine how the model objects 302 are coupled to external structures in the model production site 306. According to one example, the model objects 302 may need to be shaped and sized so that they can be installed onto external structures in the model production site 306.

Furthermore, the designer may determine how the model objects 302 are affected by external conditions in the model production site 306. According to another example, the model objects 302 may need to be configured to withstand environmental/atmospheric conditions (e.g., heat, humidity, etc.) in the model production site 306. In general, the model production site 306 may model any aspect of the actual production site 26 that may affect the combination of the model objects 302.

The model 300 is translated into the design specifications 310, which guide the production of the physical structure 20 by the robot 200 according to the designer's conception. The design specifications 310 may be expressed as computer-readable program instructions 206 for the robot 200. In some cases, the designer may develop the model 300 via computer-implemented software that receives input relating to the model 300 and generates the design specifications 310 for the robot 200 from this input. For instance, the input may include the definition of the model objects 302, the relationships 304 between model objects 302, and the relationships 308 between the model objects 302 and the model production site 306. The designer may employ computer-aided design (CAD) tools in the software to specify aspects of the model 300, e.g., relative position, angular offset (e.g., perpendicular, parallel), axial alignment, mating, etc., of the model objects 302. The control system 218 can execute the computer-readable program instructions to operate aspects of the robot 200 to build the physical structure 20.

Accordingly, the physical objects 22, which are modeled by the model objects 302, are combined by the robot 200 to produce the physical structure 20 according to the model 300. In addition, the robot 200 produces the physical structure 20 according to external structures and conditions at the production site 26, which is modeled by the model production site 306. According to one example, the model production site 306 models an interior section of a house where housing materials are installed according to the model 300. According to another example, the model production site 306 models a river site where a bridge is built according to the model 300.

Figure 4A:
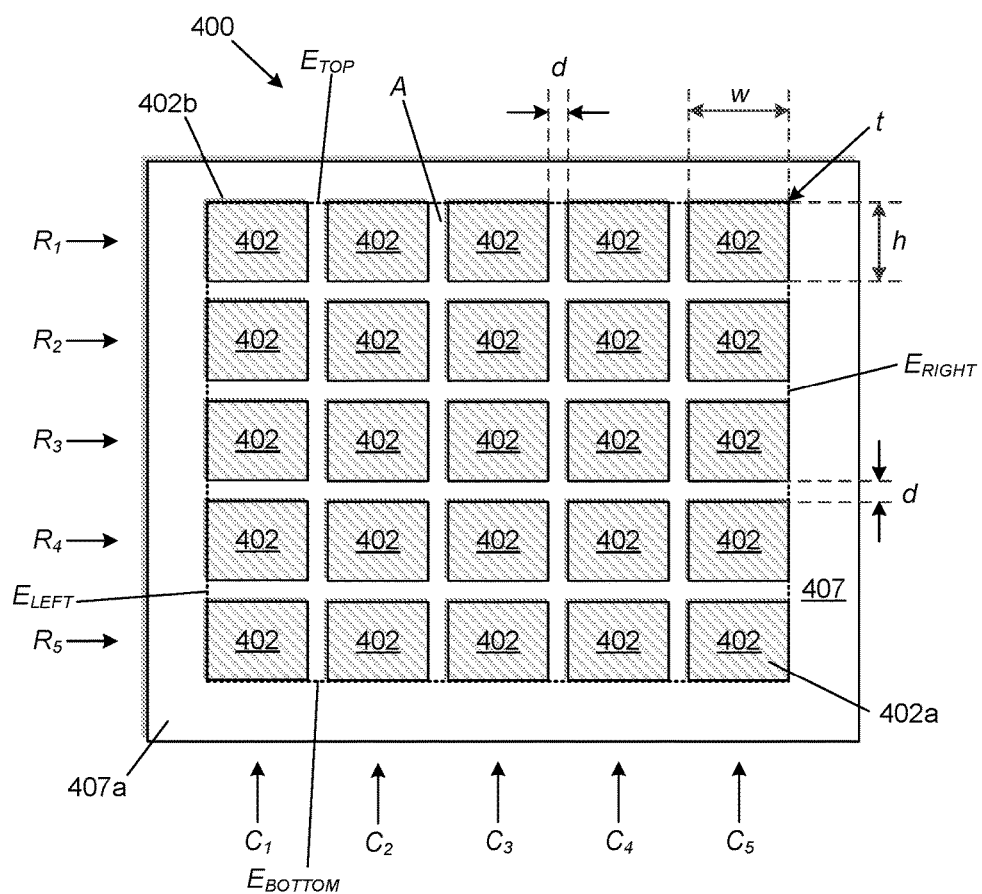
FIG. 4A illustrates an example model for installing physical tiles on a wall, according to aspects of the present disclosure.
Figure 4B:
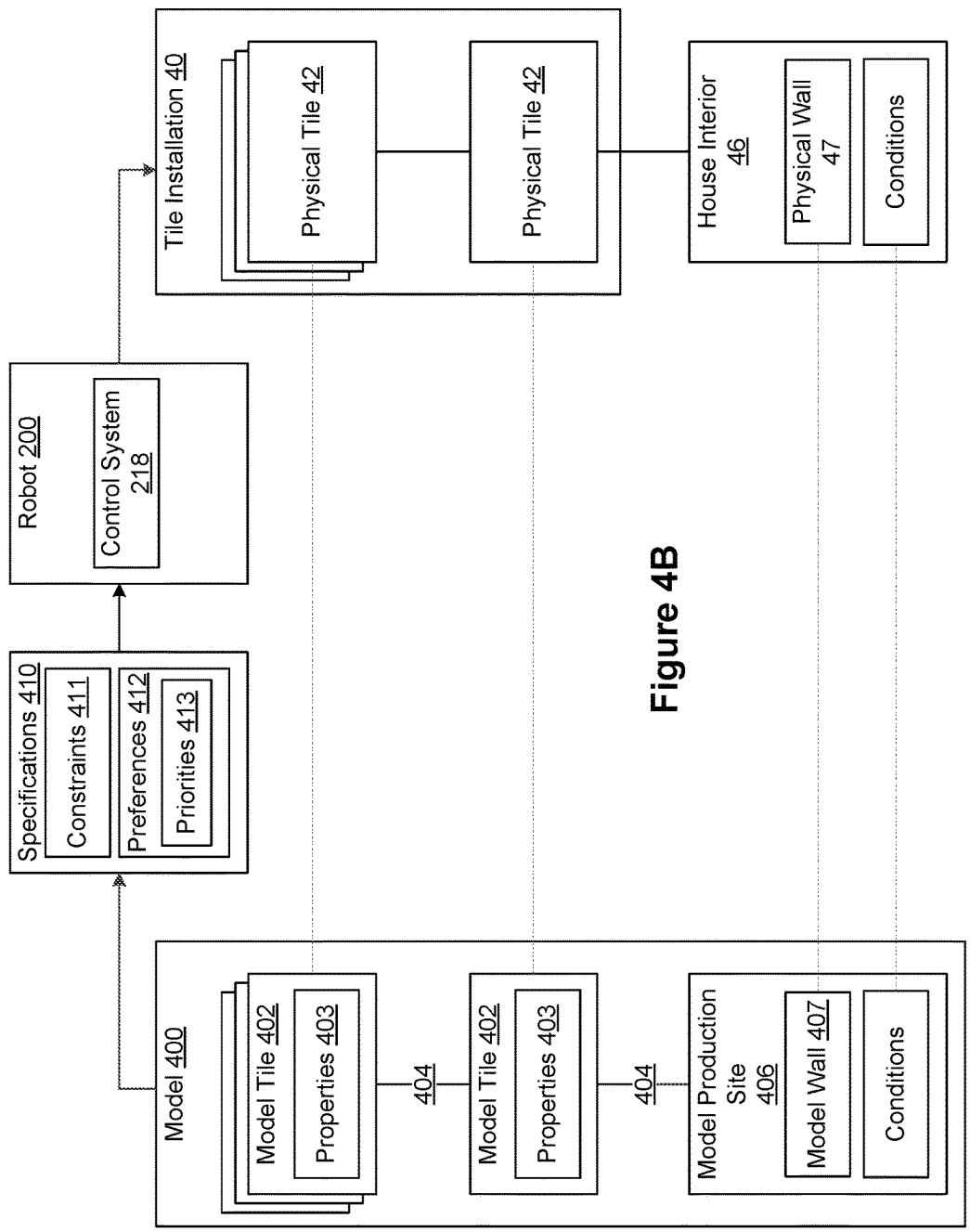
FIG. 4B illustrates an example process for generating design specifications from the model of FIG. 4A and producing a tile installation from the design specifications, according to aspects of the present disclosure.

FIGS. 4A-B illustrate aspects of an example model 400 for installing physical tiles 42 on a physical wall 47, as conceived by a designer. In the model 400, model tiles 402 are mounted on a model wall 407. The model tiles 402 model physical tiles 42 for producing a physical structure, i.e., a tile installation 40. Meanwhile, the model wall 407 is an external structure in a model production site 406, which for instance may model an interior 46 of a house.

The designer defines the model tiles 402 to have a desired set of properties 403. For instance, the designer may define all the model tiles 402 to be uniformly made from the same material as rectangular solid objects having the same height h, width w, and thickness t. Additionally, the designer may define the model tiles 402 to each have a vertical front surface 402a that provides desired aesthetic properties, such as surface finish(es), color(s), design pattern(s), etc.

The designer determines relationships 404 between the model tiles 402. For instance, the model tiles 402 are arranged in a pattern of five rows $R_{i=1, 2, 3, 4, 5}$ and five columns $C_{i=1, 2, 3, 4, 5}$, where each row $R_i$ has five model tiles 402 spaced uniformly apart by a distance d and each column $C_i$ includes five model tiles 402 spaced uniformly apart by the same distance d.

The designer also determines relationships 408 between the model tiles 402 and external structures and conditions of the model production site 406. The designer identifies a set of properties for the model wall 407. For instance, the model wall 407 includes a vertical front surface 407a with a rectangular area A for receiving the model tiles 402. The rectangular area A is defined by a top edge $E_{TOP}$, a bottom edge $E_{BOTTOM}$, a right edge $E_{RIGHT}$, and a left edge $E_{LEFT}$. The pattern of model tiles 402 is arranged within the rectangular area A. Furthermore, as shown in FIG. 4A, a top row $R_1$ of model tiles 402 abuts the top edge $E_{TOP}$ of the rectangular area A, a bottom row $R_5$ of model tiles 402 abuts the bottom edge $E_{BOTTOM}$ of the rectangular area A, a left column $C_1$ of model tiles 402 abuts the left edge $E_{LEFT}$ of the rectangular area A, and a right column $C_5$ of model tiles 402 abuts the right edge $E_{RIGHT}$ of the rectangular area A.

The model tiles 402 are mounted onto the front surface 407a of the model wall 407 with mortar. According to the model 400, each model tile 402 has a back surface 402b with a surface texture that bonds effectively with the mortar. Correspondingly, the front surface 407a has a surface texture that also bonds with the mortar. Additionally, the space d between the model tiles 402 is filled with tile grout. The conditions in the model production site 406 allow the mortar and the grout to cure properly. For instance, the environmental/atmospheric conditions in the model production site 406 provide the appropriate temperature and humidity for use of the mortar.

Accordingly, as shown in FIG. 4B, the model 400 identifies a plurality of model objects, i.e., the model tiles 402, and indicates how the plurality of model objects are combined to produce a physical structure, i.e., the tile installation 40. Furthermore, the model 400 identifies an external structure, i.e., the model wall 407, and external conditions, e.g., temperature and humidity, that are relevant to combining the model objects 402.

The properties 403 of the model tiles 402, the relationships 404 between the model tiles 402, the model production site 406, and the relationships 408 between the model tiles 402 and the model production site 406 establish a variety of parameters that determine how the tile installation 40 can be produced. By providing particular values, settings, and other instructions for these parameters, the design specifications 410 provides the robot 200 with guidance on the production of the tile installation 40.

The design specifications 410 can be expressed as computer-readable program instructions. The control system 218 of the robot 200 can execute the computer-readable program instructions 206 to operate aspects of the robot 200 to build the tile installation 40. Thus, the physical tiles 42, which are modeled by the model tiles 402, are combined by the robot 200 to produce the tile installation 40 according to the model 400.

V. Example Embodiment of Robotic System for Customizing Production of a Structure As described above with reference to FIG. 3, a designer can develop a model 300 to provide the design specifications 310 for producing the physical structure 20 with the robot 200. The model 300, though, might only reflect how the physical structure 20 will be ideally produced by the robot 200 as conceived by the designer. For instance, the model 300 might assume that the model objects 302 are precisely formed to have desired properties 303 without any variances. Additionally, the model 300 might assume that external structures and conditions modeled by the model production site 306 are ideal for combining the model objects 302.

In reality, however, the physical objects 22, which are modeled by the model objects 302 and employed to actually produce the physical structure 20, might vary from the desired properties 303 initially conceived by the designer. For instance, the model 300 may assume a level of precision that is greater than prefabricated physical objects 22 can guarantee. Variations might result inherently from the techniques employed to manufacture the physical objects 22. In addition, the physical objects 22 may be formed materials have dynamic properties that can change over time. For example, physical objects 22, such as the physical tiles 42, formed from a ceramic may experience non-uniform shrinkage during firing, or physical objects 22 formed from wood may expand due to moisture content in the air. Similarly, the external structures and conditions in the actual production site 26 may vary from those anticipated according to the model production site 306.

When developing the model 300, the designer may attempt to make the process of producing the physical structure 20 more robust by providing tolerances for certain variations in the physical objects 22 and the production site 26. For instance, the model 300 may include tolerances for small variations in the dimensions of the physical objects 22 and/or external structures that interact with the physical objects 22 at the production site 26. With tolerances built into the model 300, the robot 200 can build the physical structure 20 even if there are small variations in the physical objects 22 and/or the production site 26.

When producing the physical structure 20, however, the robot 200 may encounter issues that cannot be sufficiently addressed by the tolerances built into the model 300. For instance, measurements taken by the robot 200 may indicate that the supplied physical objects 22 are significantly larger in dimension than the tolerances of the model 300 allow. Advantageously, the robot 200 can dynamically resolve many such issues by adjusting aspects of the production process. By allowing the robot 200 to adjust the production process on its own, the production process can continue without interruption and/or intervention by user(s).

Although the adjustments to the production process may change aspects of the resulting physical structure 20, the robot 200 ensures that the production process preserves the intent of the designer as set forth in the model 300. In other words, the robot 200 can customize the production process to address issues in the production process while still producing a physical structure 20 generally consistent with the model 300.

The design specifications 310 derived from the model 300 provide the robot 200 with the necessary flexibility to customize the production process. When developing the model 300, the designer may define one or more constraints 311 that establish the scope of allowable modifications to the production process. The constraints 311 generally reflect the features that are most significant to the designer and indicate the designer's intent behind the model 300. Referring to FIG. 3, the design specifications 310 communicated to the robot 200 also include information on the constraints 311. The robot 200 can evaluate the constraints 311 to determine how to customize the production process for the physical structure 20. In general, the robot 200 has the flexibility to customize the production process as long as the physical structure 20 satisfies the constraints 311.

In addition to providing information on the constraints 311, the design specifications 310 may also provide information on preferences 312, which can further guide customization of the production process. For instance, if the production process can be customized according to a plurality of different approaches, the robot 200 can evaluate the preferences 312 to determine a preferred approach that yields a physical structure 24 most consistent with the designer's intent. In an example described below, a customized production process for installing tiles may call for resizing some of the tiles to fit an area. As the tiles may be resized in a number of different ways, preferences can be employed to help select an approach for resizing the tiles. In some cases, the designer may also prioritize the preferences 312 according to respective priorities 313, and the robot 200 can attempt to satisfy the preferences 312 with the highest priorities 313.

In some embodiments, the preferences 312 may be expressed as a type of constraint 311. In particular, the designer may also define the constraints 311 with respective weightings. The robot can evaluate the weightings to determine preferred approaches that yield a physical structure most consistent with the designer's intent. For instance, the constraints 311 may be weighted to indicate the relative importance that the designer places on each constraint 311. In some cases, the weightings may indicate that some constraints 311 must necessarily be satisfied. However, the weightings may indicate that other constraints 311 are actually preferences 312 which may be modified in order to produce the desired physical structure 20. Furthermore, the weightings may also act as the priorities 313 which indicate the order in which modifiable constraints 311 (preferences 312) should be modified, i.e., which modifiable constraints 311 (preferences 312) have higher priority 313.

According to one example, the robot 200 may construct a bridge by installing bridge structures, such as concrete piles, girders, decking pieces, etc., at a river site. Here, the actual river site may include boundaries or external structures that affect where the bridge structures are installed at the river site. For instance, there may be regulations that require certain bridge structures to be a specified distance from features such as pedestrian walkways or waterlines. A corresponding model 300 may include constraints 311 that allow the bridge construction process to be adjusted according to the location of such features at the actual river site. The actual river site may also include may have a sloping ground surface and/or various soil conditions. The model 300 may include constraints 311 that allow bridge construction process to be adjusted to drive concrete piles at particular locations and/or depths based on sloping ground surface and/or soil conditions. In addition, the actual river site may experience exposure from the sun according to particular orientations. The model 300 may include preferences 312 that allow the bridge construction process to be adjusted so that the bridge can provide shade for pedestrians or drivers. In one case, the bridge may be constructed with angled shading louvers that can be adjusted according to specific angles of sunlight at the river site could be used to adjust the angle of shading louvers.

Upon determining an approach for customizing the production site, the robot 200 can also store and/or send a report on the customization. In some cases, such reporting may provide another party, such as a customer, documentation with information on the customized aspects of the physical structure 24 resulting from the customized production process. The report may be sent to another party for approval before the production process begins and/or sent to document the production process after the physical structure 24 is completed.

As described above, FIGS. 4A-B illustrate the example model 400 for producing the tile installation 40 (physical structure) on the wall 41 (external structure) in a house interior 46 (production site). The model 400 is translated into design specifications 410, which can guide the production of the tile installation 40 by the robot 200. As shown particularly in FIG. 4B, the design specifications 410 may also provide constraints 411 and preferences 412. Furthermore, the design specifications 410 may provide respective priorities 413 for the preferences 412.

Figure 5A:
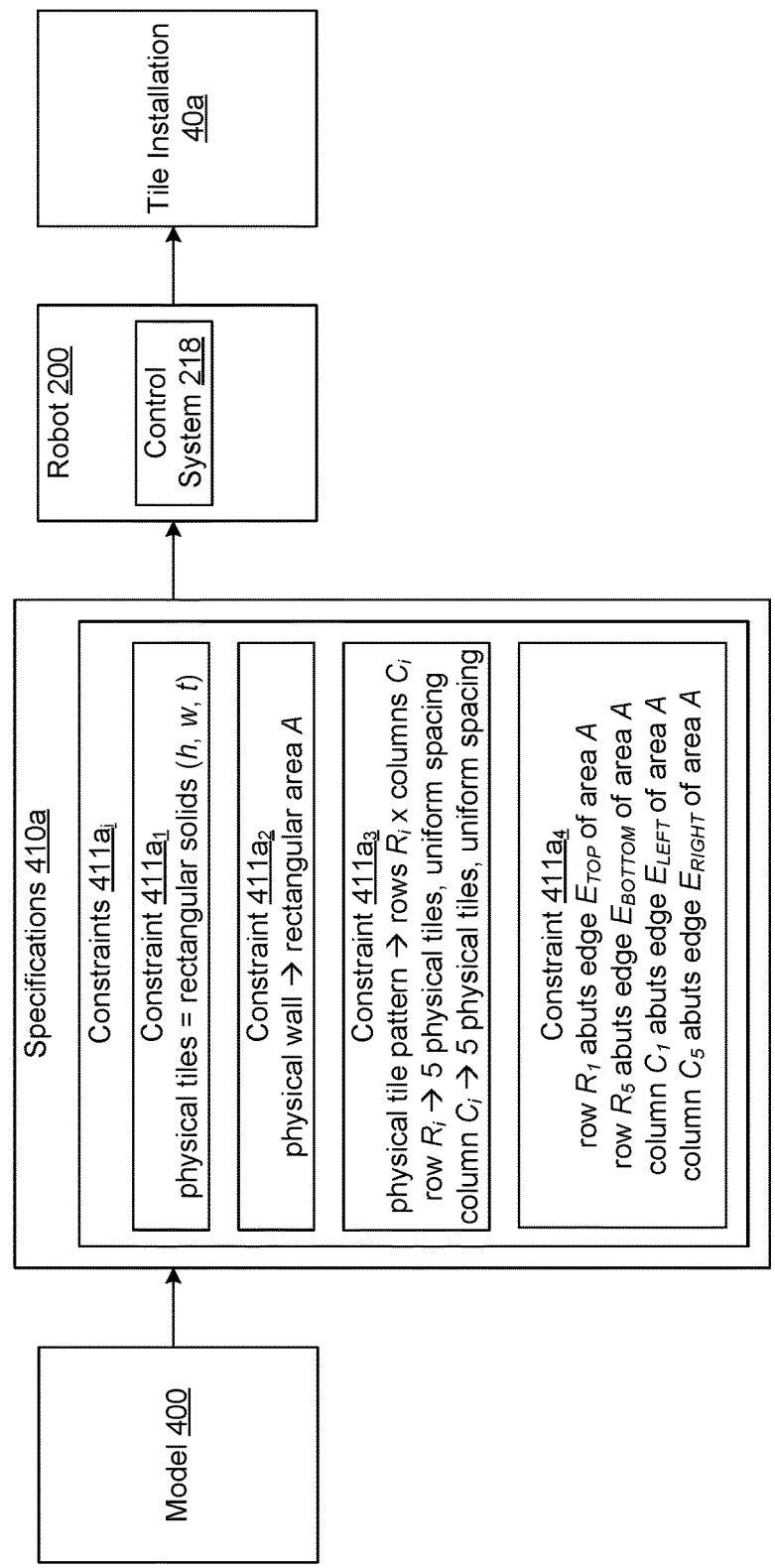
FIG. 5A illustrates example design specifications, including constraints, for installing physical tiles on a wall, according to aspects of the present disclosure.

FIG. 5A illustrates example design specifications $410a$, including example constraints $411a_i$, from the model 400. In particular, a first constraint $411a_1$ requires the physical tiles 42 to be formed as rectangular solids having substantially the height h, the width w, and the thickness t. A second constraint $411a_2$ requires the physical wall 47 to have a front surface $47a$ with a rectangular area A across which the physical tiles 42 can be mounted. Additionally, a third constraint $411a_3$ requires the physical tiles 42 to be mounted according to a pattern of rows $R_i$ and columns $C_i$ where each row $R_i$ has five physical tiles 42 spaced uniformly apart and each column $C_i$ includes five physical tiles 42 spaced uniformly apart. Furthermore, a fourth constraint $411a_4$ requires a top row $R_1$ of physical tiles 42 to abut a top edge $E_{TOP}$ of the rectangular area A, a bottom row $R_5$ of physical tiles 42 to abut a bottom edge $E_{BOTTOM}$ of the rectangular area A, a left column $C_1$ to abut a left edge $E_{LEFT}$ of the rectangular area A, and a right column $C_5$ to abut a right edge $E_{RIGHT}$ of the rectangular area A.

Figure 5B:
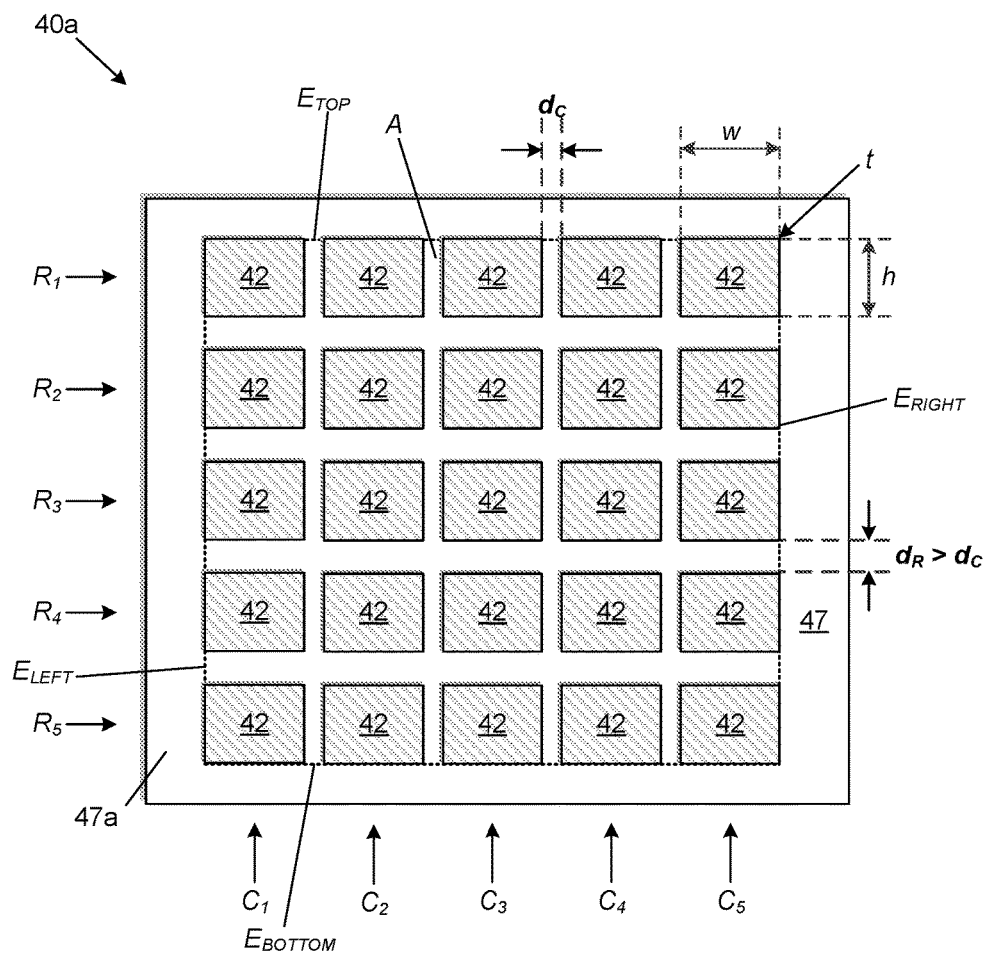
FIG. 5B illustrates an example tile installation produced according to the example design specifications of FIG. 5A, according to aspects of the present disclosure.

In operation, the constraints $411_{i=1, 2, 3, 4}$ are communicated to the robot 200 via the design specifications $410a$. The robot 200 is configured to produce a tile installation $40a$ as illustrated in FIG. 5B according to the design specifications $410a$, including constraints $411_{i=1, 2, 3, 4}$. The robot 200 can maneuver itself at the production site (i.e., the house interior 46) and use any of the end-effectors 211 and the sensors 212 described above to manipulate and mount the physical tiles 42 on the physical wall 47. Prior to mounting the physical tiles 42, however, the robot 200 can assess whether the constraints $411_{i=1, 2, 3, 4}$ can be satisfied. Furthermore, the robot 200 can determine what aspects of the tile installation process may need to be modified to satisfy the constraints $411_{i=1, 2, 3, 4}$.

The robot 200 can employ the appropriate end-effector(s) 211 to manipulate each physical tile 42 and can employ the appropriate sensor(s) 212 (e.g., 3D image scanning sensors) to measure the dimensions of each physical tile 42. The robot 200 can then determine whether each physical tile 42 has a rectangular solid shape with substantially the height h, the width w, and the thickness t according to the constraint $411a_1$. Although the model tiles 402 in the model 400 may have the precise dimensions defined by the designer, one or more of the physical tiles 42 measured by the robot 200 might have different dimensions. For instance, a supplier might erroneously deliver a wrong stock of tiles having dimensions that do not correspond to desired measurements. For another instance, the dimensions of some of the physical tiles 42 may change if the physical tiles 42 break during shipment from the supplier. If the robot 200 determines that one or more of the physical tiles 42 do not have the dimensions specified by the constraint $411a_1$, the robot 200 in some cases can dynamically cure the discrepancies by cutting the physical tiles 42 to the proper size and shape with the appropriate end-effector(s) 211. Accordingly, the robot 200 can customize the tile installation process by adding steps to rework the physical tiles 42 to satisfy the first constraint $411a_1$. Advantageously, such customization allows the tile installation process to continue without interruption and/or intervention by user(s).

To determine whether the second constraint $411a_2$ can be satisfied, the robot 200 can employ the appropriate sensor(s) 212 (e.g., 3D image scanning sensors) to identify and measure the rectangular area A on the front surface $47a$ of the physical wall 47. To determine whether five rows $R_i$ and five columns $C_i$ of the physical tiles 42 can be mounted to the physical wall 47 according to the third constraint $411a_3$, the robot 200 can first determine the availability of twenty-five physical tiles 42 satisfying the constraint $411a_1$. Furthermore, the robot 200 can compare the measurements of the rectangular area A and the dimensions of the physical tiles 42 to determine whether five rows $R_i$ and five columns $C_i$ of the physical tiles 42 can fit in the rectangular area A according to the third constraint $411a_3$.

The third constraint $411a_3$ also requires the five physical tiles 42 along each row $R_i$ to be uniformly spaced and the five physical tiles 42 along each column $C_i$ to be uniformly spaced. The fourth constraint $411a_4$, however, also requires the top row $R_1$, the bottom row $R_5$, the left column $C_1$, and the right column $C_5$ to abut the edges $E_{TOP}$, $E_{BOTTOM}$, $E_{RIGHT}$, $E_{LEFT}$ of the rectangular area A, respectively. The robot 200 has the flexibility to customize the installation process to satisfy both constraints $411a_3$ and $411a_4$. In particular, the robot 200 can select an appropriate spacing $d_R$ between the five physical tiles 42 along each row $R_i$ so that each row $R_i$ extends across the rectangular area A to allow the left column $C_1$ to abut the left edge $E_{LEFT}$ and the right column $C_5$ to abut the right edge $E_{RIGHT}$. Similarly, the robot 200 can select an appropriate spacing $d_C$ between the five physical tiles 42 along each column $C_i$ so that each column $C_i$ extends down the rectangular area A and allows the top row $R_1$ to abut the top edge $E_{TOP}$ and the bottom row $R_1$ to abut the bottom edge $E_{BOTTOM}$. As shown in FIG. 5B, the spacing $d_R$ is greater than the spacing $d_C$.

Ideally, the robot 400 produces a tile installation 40a that closely resembles the model 400 as initially conceived by the designer (shown in FIG. 4A). In particular, according to the initial conception in the model 400, the spacing between the five model tiles 402 along each row $R_i$ and the spacing between the five model tiles 402 along each column $C_i$ are both equal to a distance d. The actual physical tiles 42 and the rectangular area A on the physical wall 47, however, might differ from how they are modeled by the model tiles 402 and the model wall 407. In particular, the rectangular area A may be larger than, or have a shape that is different from, what the designer anticipated. Advantageously, the robot 200 can accommodate such unanticipated circumstances.

The constraints $411a_{i=1, 2, 3, 4}$ reflect the designer's intent while also defining a dynamic design space where parameters in the tile installation process can be modified to accommodate reality. As shown in FIG. 5B, the spacing distance $d_R$ and the spacing distance $d_C$ are parameters that can be employed to customize the tile installation process. Although the tile installation 40a shown in FIG. 5B may differ in some aspects from the model 400 shown in FIG. 4A, the tile installation 40a still preserves the designer's intent as defined by the constraints $411a_{i=1, 2, 3, 4}$.

In some cases, the robot 200 may determine that one or more constraints $411a_{i=1, 2, 3, 4}$ cannot be satisfied even if the tile installation process is modified. As such, the robot 200 can cease further activity in connection with the tile installation 40a. In other words, the robot 200 can make an automatic "go/no go" decision based on the robot's evaluation of the constraints $411a_{i=1, 2, 3, 4}$. If the robot 200 makes a "no go" decision, the robot 200 can communicate an alert, so that a user (or other system) can intervene and determine how to proceed. If possible, further information and/or instructions are communicated to the robot 200 to allow the robot 200 to proceed with the tile installation process. For instance, one or more of the constraints $411a_{i=1, 2, 3, 4}$ may be modified and/or the robot 200 may be allowed to ignore one or more of the constraints $411a_{i=1, 2, 3, 4}$.

Figure 6A:
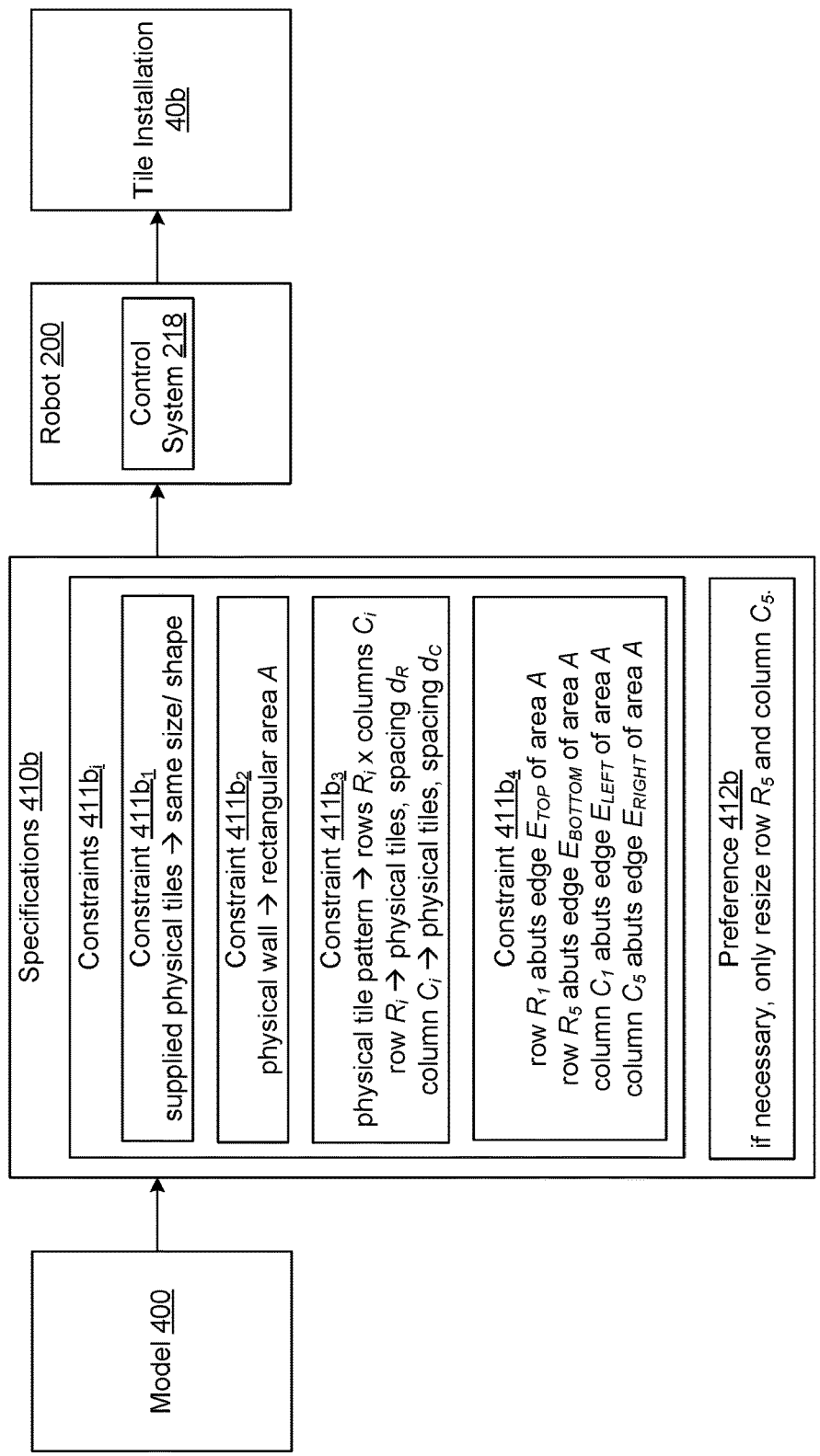
FIG. 6A illustrates another example of design specifications, including constraints and preferences, for installing physical tiles on a wall, according to aspects of the present disclosure.

The example of FIGS. 5A-B is only one example of how the robot 200 can adjust parameters to customize the tile installation process to produce a tile installation based on the model 400. FIG. 6A illustrates another example of design specifications 410b, including example constraints $411b_{i=1, 2, 3, 4}$ and at least one preference 412b from the model 400. In particular, a first constraint $411b_1$ requires the physical tiles 42 as supplied to share substantially the same size and shape, regardless of the actual size and shape. A second constraint $411b_2$ also requires the wall 47 to have a front surface 47a with a rectangular area A across which the physical tiles 42 can be mounted. Additionally, a third constraint $411b_3$ also requires the physical tiles 42 to be mounted according to a pattern of rows R and columns C, where each row R includes a plurality of physical tiles 42 spaced uniformly apart by a set distance $d_R$ and each column includes a plurality of physical tiles 42 spaced uniformly apart by a set distance $d_C$. Additionally, a fourth constraint $411b_4$ requires a top row $R_{TOP}$ of physical tiles 42 to abut a top edge $E_{TOP}$ of the rectangular area A, a bottom row $R_{BOTTOM}$ of physical tiles 42 to abut a bottom edge $E_{BOTTOM}$ of the rectangular area A, a right column $C_{RIGHT}$ to abut a right edge $E_{RIGHT}$ of the rectangular area A, and a left column $C_{LEFT}$ to abut a left edge $E_{LEFT}$ of the rectangular area A.

In operation, the constraints $411b_{i=1, 2, 3, 4}$ are communicated to the robot 200 via the design specifications 410b. The robot 200 is configured to produce a tile installation 40b as illustrated in FIG. 5B according to the design specifications 410a. The robot 200 can maneuver itself at the production site (i.e., the house interior 46) and use any of the end-effectors 211 and the sensors 212 described above to manipulate and mount the physical tiles 42 on the physical wall 47. Prior to mounting the physical tiles 42, however, the robot 200 can assess whether the constraints $411b_{i=1, 2, 3, 4}$ can be satisfied. Furthermore, the robot 200 can determine what aspects of the tile installation process may need to be modified to satisfy the constraints $411b_{i=1, 2, 3, 4}$.

Figure 6B:
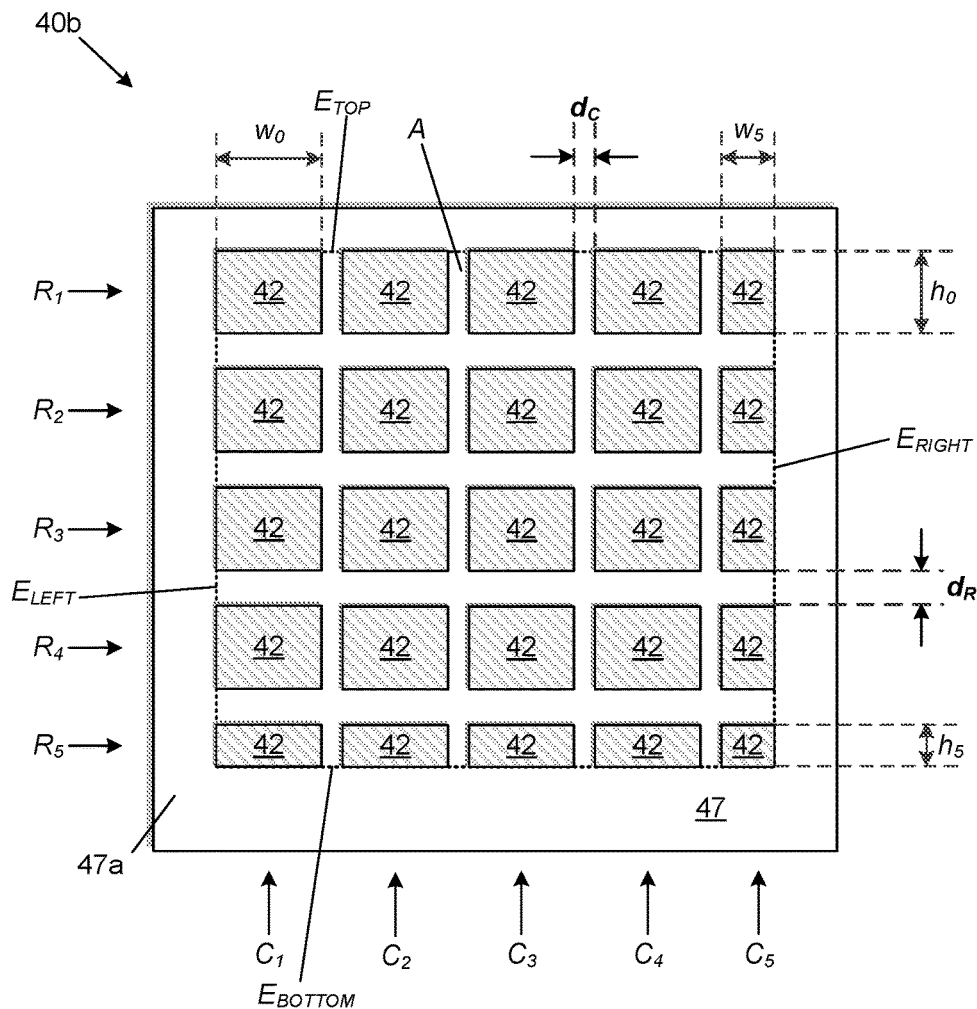
FIG. 6B illustrates an example tile installation produced according to the example design specifications of FIG. 6A, according to aspects of the present disclosure.

The robot 200 can employ the appropriate end-effector(s) 211 to manipulate each physical tile 42 as supplied and can employ the appropriate sensor(s) 212 (e.g., 3D image scanning sensors) to measure the dimensions of each physical tile 42. The robot 200 can then determine whether the physical tiles 42 as supplied share substantially the same size and shape according to the first constraint $411b_1$. This may be considered an inventory inspection step prior to installation. As shown in FIG. 6B, the physical tiles 42 as supplied generally have a height $h_0$ and a width $w_0$.

To determine whether the second constraint $411b_2$ can be satisfied, the robot 200 can employ the appropriate sensor(s) 212 (e.g., 3D image scanning sensors) to identify and measure the rectangular area A on the front surface 47a of the physical wall 47. The robot 200 can then compare the measurements of the rectangular area A and the dimensions of the physical tiles 42 to determine whether a plurality of rows $R_i$ of the physical tiles and a plurality of columns $C_i$ of the physical tiles 42 can be mounted within the rectangular A according to the third constraint $411b_3$.

The third constraint $411b_3$ also requires the physical tiles 42 along each row $R_i$ to be uniformly spaced at the set distance $d_R$ and the physical tiles 42 along each column $C_i$ to be uniformly spaced at the set distance $d_C$. The fourth constraint $411b_4$, however, also requires the top row $R_1$, the bottom row $R_5$, the left column $C_1$, and the right column $C_5$ to abut the edges $E_{TOP}$, $E_{BOTTOM}$, $E_{RIGHT}$, $E_{LEFT}$ of the rectangular area A, respectively.

As shown in FIG. 6B, the rectangular area A may not be dimensioned to allow a whole number of the physical tiles 42 with the height $h_0$ to extend across the rows $R_i$ and allow the top row $R_1$ to abut the top edge $E_{TOP}$ and the bottom row $R_5$ to abut the bottom edge $E_{BOTTOM}$, while also maintaining the set spacing distance $d_R$. Additionally, the rectangular area A may not be dimensioned to allow a whole number of the physical tiles 42 with the width $w_0$ to extend down the columns $C_i$ and allow the left column $C_1$ to abut the left edge $E_{LEFT}$ and the right column $C_5$ to abut the right edge $E_{RIGHT}$, while also maintaining the set spacing distance $d_C$. The robot 200, however, has the flexibility to customize the installation process to satisfy both constraints $411b_3$ and $411b_4$. In particular, the robot 200 can employ appropriate end-effector(s) 211 to cut/resize one or more of the physical tiles 42 extending along one or more of the rows $R_i$. Similarly, the robot 200 can employ the appropriate end-effector(s) 211 to cut/resize one or more of the physical tiles 42 extending down one or more of the column $C_i$.

According to one approach, the robot 200 can resize each physical tile 42 extending along each row $R_i$ so that the rows $R_i$ share the same reduced height (less than the height $h_0$). At this reduced height, uniform rows $R_i$ are be spaced at the set distance $d_R$ with the top row $R_1$ abutting the top edge $E_{TOP}$ and the bottom row $R_5$ abutting the bottom edge $E_{BOTTOM}$. Similarly, the robot 200 can resize each physical tile 42 extending down each column $C_i$ so that the columns $C_i$ share the same reduced width (less than the width $w_0$). At this reduced width, uniform columns $C_i$ are be spaced at the set distance $d_C$ with the left column $C_{LEFT}$ abutting the top edge $E_{RIGHT}$ and the right column $C_5$ abutting the right edge $E_{RIGHT}$.

The design specifications 410b, however, also includes a preference 412b, which provides that, if necessary, only the physical tiles 42 extending along the bottom row $R_5$ are resized to have a reduced height and/or only the physical tiles 42 extending down the right column $C_5$ are resized to have a reduced width. In other words, the designer intends to maintain the physical tiles 42 at their initial dimensions (as supplied) as much as possible. Accordingly, as shown in FIG. 6B, the robot 200 preferably resizes the physical tiles 42 so that the bottom row $R_5$ has a height $h_5$ that is less than the initial height $h_0$ of the other rows $R_{i=1, 2, 3, 4}$, and the right column $C_5$ has a width $w_5$ that is less than the initial width $w_0$ of the other columns $C_{i=1, 2, 3, 4}$.

As described above, the actual physical tiles 42 and the rectangular area A on the physical wall 47 might differ from how they are initially modeled by the model tiles 402 and the model wall 407. The design specifications 410a, 410b define respective design spaces where different parameters in the tile installation process can be modified to accommodate reality. Different constraints and preferences in the design specifications may yield different physical structures.

Instead of adjusting the spacing distances between the physical tiles, the robot 200 in the example of FIGS. 6A-B can dynamically change the size of the physical tiles 42 to satisfy the constraints $411b_{i=1, 2, 3, 4}$. Furthermore, the robot 200 can refer to the preference 412b to determine a preferred approach to customizing the tile installation process. Although the tile installation 40b shown in FIG. 6B may differ in some aspects from the model 400 shown in FIG. 4A, the tile installation 40b still preserves the designer's intent as defined by the constraints $411b_{i=1, 2, 3, 4}$ and the preference 412b.

In general, the constraints and preferences in the examples above allow the robot 200 to decide automatically whether the adjustments to the tile installation process involve adjusting parameters relating to the spacing between the physical tiles 42 and/or parameters relating to the resizing the physical tiles 42 to fit the area A. For example, adjusting the spacing may be a lower-cost operation than resizing the physical tiles 42, so the designer may define the constraints and preferences so that the robot 200 is biased to adjust the spacing between the physical tiles 42 over resizing the physical tiles 42. However, the designer may also define the constraints and preferences so that the robot 200 decides to resize the physical tiles 42 if adjustments cause the spacing between the physical tiles 42 to exceed a threshold. The constraints and preferences allow the robot 200 to make such decisions dynamically and automatically without requiring intervention by an operator or other system.

The examples above describe how a robot can dynamically adjust aspects of a production process. Of course, such adjustments are not limited to changing the spacing between the physical tiles 42 in a rectangular array or resizing the physical tiles 42 in a tile installation 40. For other tile installations, the designer may provide different constraints and preferences that involve adjusting the pattern by which the physical tiles 42 are mounting in an area A' of the physical wall 47. For instance, the area A' may be more circular in shape. In response, the robot 200 may determine, from the constraints and preferences, that the tile installation process should be adjusted to mount the physical tiles 42 according to a particular spiraling pattern, concentric pattern, starburst pattern, or other circular design to fit the area A'.

Furthermore, aspects of the present invention are not limited to the installation of tiles. For instance, as described above, aspects of the present invention can be applied to construct a bridge by installing concrete piles, girders, decking pieces, etc., at a river site including opposing river banks and the area between the river banks. According to other examples, aspects of the present invention can be applied to combine parts on a factory floor to build products such as consumer goods, vehicle parts, etc.

VI. Conclusion

A robot can use end-effector(s) and sensor(s) to combine a plurality of physical objects into a desired physical structure. To produce this physical structure, the robot may be guided by design specifications that are generated from a model for the physical structure. In view of the foregoing, a robot can dynamically adjust aspects of a production process to account for differences between the model and physical reality. The design specifications derived from the model provide the robot with the necessary flexibility to customize the production process. The design specifications define a flexible design space where different parameters in the production process can be modified to accommodate physical reality. Although the adjustments to the production process may change aspects of the resulting physical structure, the robot can ensure that the production process preserves the intent of the designer provided in the model.

The above detailed description describes various features and functions of the disclosed systems, devices, and methods with reference to the accompanying figures. In the figures, similar symbols typically identify similar components, unless context indicates otherwise. The illustrative implementations described in the detailed description, figures, and claims are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example implementations. Alternative implementations are included within the scope of these example implementations. In these alternative implementations, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

A computer-readable medium may include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A method for a robotic system, comprising:
    positioning one or more end-effectors of a robot at a production site, the one or more end-effectors configured to combine, according to a production process, at least one object and one or more structures at the production site;
    determining, with one or more sensors at the production site, sensor data relating to the production process;
    storing, on one or more data storage devices, specifications for the production process based on a model of at least one of the production site or the at least one object, the specifications indicating constraints that have to be satisfied, and preferences that do not have to be satisfied, wherein each preference indicated by the specifications includes indicia indicating an importance of satisfying the preference relative to satisfying other preferences indicated by the specifications;
    determining, from the sensor data, properties of at least one of the production site or the at least one object;
    determining one or more differences between the properties and the model;
    identifying, by an automated control system for the robot, multiple different approaches for customizing the production process to yield a physical structure that satisfies the constraints despite the one or more differences between the properties and the model;
    selecting, by the automated control system for the robot and from among the multiple different approaches for customizing the production process, a particular approach for customizing the production process that satisfies the constraints indicated by the specifications and that satisfies one or more of the specifications having a highest relative importance of satisfying the preference;
    determining one or more adjustments to the production process based on the one or more differences and the selected, particular approach for customizing the production process; and
    sending, for the one or more end-effectors, one or more instructions for combining the at least one object and the one or more structures based on the specifications and the one or more adjustments to the production process.

2. The method of claim 1, wherein the one or more structures is a part of the production site, and combining the at least one object and the one or more structures includes installing the at least one object into or onto the one or more structures.

3. The method of claim 1, further comprising determining, with the one or more sensors, additional sensor data relating to the one or more structures wherein the one or more adjustments to the production process are determined further on the additional sensor data.

4. The method of claim 1, wherein determining the sensor data includes measuring physical dimensions of at least one of the production site or the at least one object.

5. The method of claim 1, wherein determining the sensor data includes measuring environmental conditions at the production site.

6. The method of claim 5, further comprising sending a report relating to combining the at least one object and the one or more structures based on the specifications and the one or more adjustments.

7. A robotic system comprising one or more computers and one or more storage devices storing instructions that are operable, when executed by the one or more computers, to cause the one or more computers to perform operations comprising:
    positioning one or more end-effectors of a robot at a production site, the one or more end-effectors configured to combine, according to a production process, at least one object and one or more structures at the production site;
    determining, with one or more sensors at the production site, sensor data relating to the production process;
    storing, on one or more data storage devices, specifications for the production process based on a model of at least one of the production site or the at least one object, the specifications indicating constraints that have to be satisfied, and preferences that do not have to be satisfied, wherein each preference indicated by the specifications includes indicia indicating an importance of satisfying the preference relative to satisfying other preferences indicated by the specifications;
    determining, from the sensor data, properties of at least one of the production site or the at least one object;
    determining one or more differences between the properties and the model;
    identifying, by an automated control system for the robot, multiple different approaches for customizing the production process to yield a physical structure that satisfies the constraints despite the one or more differences between the properties and the model;

selecting, by the automated control system for the robot and from among the multiple different approaches for customizing the production process, a particular approach for customizing the production process that satisfies the constraints indicated by the specifications and that satisfies one or more of the specifications having a highest relative importance of satisfying the preference;

determining one or more adjustments to the production process based on the one or more differences and the selected, particular approach for customizing the production process; and sending, for the one or more end-effectors, one or more instructions for combining the at least one object and the one or more structures based on the specifications and the one or more adjustments to the production process.

8. The system of claim 7, wherein the one or more structures is a part of the production site, and combining the at least one object and the one or more structures includes installing the at least one object into or onto the one or more structures.

9. The system of claim 7, wherein the operations comprise determining, with the one or more sensors, additional sensor data relating to the one or more structures wherein the one or more adjustments to the production process are determined further on the additional sensor data.

10. The system of claim 7, wherein determining the sensor data includes measuring physical dimensions of at least one of the production site or the at least one object.

11. The system of claim 7, wherein determining the sensor data includes measuring environmental conditions at the production site.

12. The system of claim 11, wherein the operations comprise sending a report relating to combining the at least one object and the one or more structures based on the specifications and the one or more adjustments.

13. A non-transitory computer-readable storage device storing instructions executable by one or more computers which, upon such execution, cause the one or more computers to perform operations comprising:

positioning one or more end-effectors of a robot at a production site, the one or more end-effectors configured to combine, according to a production process, at least one object and one or more structures at the production site;

determining, with one or more sensors at the production site, sensor data relating to the production process;

storing, on one or more data storage devices, specifications for the production process based on a model of at least one of the production site or the at least one object, the specifications indicating constraints that have to be satisfied, and preferences that do not have to be satisfied, wherein each preference indicated by the specifications includes indicia indicating an importance of satisfying the preference relative to satisfying other preferences indicated by the specifications;

determining, from the sensor data, properties of at least one of the production site or the at least one object;

determining one or more differences between the properties and the model;

identifying, by an automated control system for the robot, multiple different approaches for customizing the production process to yield a physical structure that satisfies the constraints that despite the one or more differences between the properties and the model;

selecting, by the automated control system for the robot and from among the multiple different approaches for customizing the production process, a particular approach for customizing the production process that satisfies the constraints indicated by the specifications and that satisfies one or more of the specifications having a highest relative importance of satisfying the preference;

determining one or more adjustments to the production process based on the one or more differences and the selected, particular approach for customizing the production process; and sending, for the one or more end-effectors, one or more instructions for combining the at least one object and the one or more structures based on the specifications and the one or more adjustments to the production process.

14. The device of claim 13, wherein the one or more structures is a part of the production site, and combining the at least one object and the one or more structures includes installing the at least one object into or onto the one or more structures.

15. The device of claim 13, wherein the operations comprise determining, with the one or more sensors, additional sensor data relating to the one or more structures wherein the one or more adjustments to the production process are determined further on the additional sensor data.

16. The device of claim 13, wherein determining the sensor data includes measuring physical dimensions of at least one of the production site or the at least one object.

17. The device of claim 13, wherein determining the sensor data includes measuring environmental conditions at the production site.

18. The device of claim 17, wherein the operations comprise sending a report relating to combining the at least one object and the one or more structures based on the specifications and the one or more adjustments.

* * * * *